US010254971B2

(12) United States Patent
Tripathy et al.

(10) Patent No.: US 10,254,971 B2
(45) Date of Patent: Apr. 9, 2019

(54) SYSTEM AND METHOD FOR DYNAMIC RE-SERIALIZATION OF VTL DEVICES AND CARTRIDGES

(71) Applicant: QUEST SOFTWARE INC., Aliso Viejo, CA (US)

(72) Inventors: Tarun K. Tripathy, Newark, CA (US); Abhijit Dinkar, San Jose, CA (US); Vladimir Fonseca Alvarez, Brentwood, CA (US)

(73) Assignee: QUEST SOFTWARE INC., Aliso Viejo, CA (US)

( * ) Notice: Subject to any disclaimer, the term of this patent is extended or adjusted under 35 U.S.C. 154(b) by 384 days.

(21) Appl. No.: 15/256,449

(22) Filed: Sep. 2, 2016

(65) Prior Publication Data

US 2018/0067658 A1 Mar. 8, 2018

(51) Int. Cl.
*G06F 17/00* (2006.01)
*G06F 3/06* (2006.01)
*G06F 17/30* (2006.01)

(52) U.S. Cl.
CPC ............ *G06F 3/0611* (2013.01); *G06F 3/065* (2013.01); *G06F 3/0664* (2013.01); *G06F 3/0686* (2013.01); *G06F 17/30215* (2013.01)

(58) Field of Classification Search
CPC .... G06F 3/0686; G06F 11/1453; G06F 3/067; G06F 3/0608; G06F 3/0619; G06F 3/065
See application file for complete search history.

(56) References Cited

U.S. PATENT DOCUMENTS

2013/0298183 A1* 11/2013 McGrath ................ G06F 9/455
726/1

* cited by examiner

*Primary Examiner* — Truong V Vo
(74) *Attorney, Agent, or Firm* — Maschoff Brennan

(57) ABSTRACT

Certain embodiments of the present disclosure provide systems and associated methods for dynamically re-serializing virtual tape library cartridges. The system comprises a first server node including a first virtual tape library residing on a deduplication file system, in which a backup data file corresponding to a first cartridge is stored in a first container with a first base prefix. A second server node includes a second virtual tape library residing on a second deduplication file system, and is configured to receive and store a replica of the backup data file corresponding to a second cartridge in a second container such that the second cartridge includes the same first base prefix as the first cartridge. An activation code is assigned to the second container, and used to re-serialize the first base prefix to form a second base prefix such that the second cartridge is presented with the second base prefix.

20 Claims, 8 Drawing Sheets

SYSTEM AND METHOD FOR DYNAMIC RE-SERIALIZATION OF VTL DEVICES AND CARTRIDGES

TECHNICAL FIELD

The present disclosure relates generally to data storage systems, and more specifically to virtual tape libraries.

BACKGROUND

Tape technology remains the most cost effective backup solution to date for data archival. With current tape technology, tape media may have a lifetime of 30 years or more. However, writing data to tape media in a tape library can be a slow and time consuming process and may exceed the timeframe of a backup window for particular production system. In recent years, disk based backup has gained popularity due to a drop in disk prices and due a lesser need for manual intervention. The performance of disk based backup is generally consider faster and individual file restores from disk are significantly faster due to faster seek times.

A virtual tape library (VTL) is a disk based backup system which appears to the backup host as a real tape library system. Backup streams are however written to and restored from disk. The biggest advantage of a VTL over other disk based backup solutions is its seamless integration into an existing tape backup infrastructure. Backup applications, policies, licenses, etc. need not change due to a VTL emulating an existing tape library system.

VTLs may be used to "front-end" the tape system with a cache of disk drives, enabling backup data to be written to the cache very rapidly and allowing the production system to get back to work. Another advantage is that tape jobs may be "stacked" on the VTL, prior to writing the data to tape. This addressed a problem in mainframes that resulted in tape media being used very inefficiently, enabling write jobs to use the entire reel or cartridge rather than writing data in dribs and drabs across many pieces of media.

Once data is copied to the VTL disk, as an "off-line" or "near-line" process, the cached data can then be written to the tape system where it could be used to make local and off-site copies of the backup data. This multi-stage process can be used to eliminate "data friction," the production latencies brought about by slow data copies.

SUMMARY

The following presents a simplified summary of the disclosure in order to provide a basic understanding of certain embodiments of the present disclosure. Provided are examples of mechanisms and processes relating to dynamically re-serialization of virtual tape library cartridges In one aspect, which may include at least a portion of the subject matter of any of the preceding and/or following examples and aspects, a system comprises a first server node including a first virtual tape library server of backup data files residing on a first deduplication file system. A backup data file corresponding to a first cartridge is stored in a first container in the first virtual tape library. The first container may include a first base prefix and the namespace of the first cartridge may include the first base prefix.

The system further comprises a second server node including a second virtual tape library residing on a second deduplication file system. The second server node may be configured to receive a replica of the backup data file corresponding to the first cartridge via one or more data packets over a network, and store the replica backup data file in a second container in the second virtual tape library such that the replica backup data file corresponds to a second cartridge. The first base prefix may be replicated to the second container such that the namespace of the second cartridge is the same as the namespace of the first cartridge.

The second virtual tape library may be configured to assign an activation code to the second container, and re-serialize the first base prefix using the activation code to form a second base prefix such that the presentation of the second cartridge includes the second base prefix. Re-serializing the first base prefix includes using a salt algorithm to output the second base prefix.

The system may further comprise a client device including a data management application for accessing the replica backup data file in the second container. The replica backup data file corresponding to the second cartridge is the same as the backup data file corresponding to the first cartridge and is recognized as a replicated backup in the second virtual tape library by the data management application.

In some aspects, the first server node and the second server node comprise a multi-domain data network. In such aspects, the second container may be activated in a first mode such that the second container is accessed in read-only mode while allowing replication to continue. The second container may also be activated in a second mode such that the second container is accessed in read-write mode while replication is discontinued.

In some aspects, the first server node and the second server node comprise a single-domain data network. In such aspects, activation of the second container causes the second container to be presented in read-write and the second base prefix remains the same as the first base prefix after re-serializing.

In further aspects, the system may further comprise a third server node including a third virtual tape library residing on third deduplication file system. The third server node may be configured to receive a replica of the backup data file corresponding to the first cartridge via one or more data packets over the network, and store the replica backup data files in a third container in the third virtual tape library such that the replica backup data file corresponds to a third cartridge. The first base prefix may be replicated to the third container such that the namespace of the third cartridge includes the first base prefix.

The third virtual tape library may be configured to assign an activation code to the third container and activate the activation code, and re-serialize the first base prefix using the activation code to form a second base prefix such that the presentation of the second cartridge includes the second base prefix.

In another aspect, which may include at least a portion of the subject matter of any of the preceding and/or following examples and aspects, a method for dynamically re-serializing cartridges in a virtual tape library is provided. The method comprises storing, at a first server node, a backup data file in a first virtual tape library residing on a first deduplication file system. The backup data file corresponds to a first cartridge stored in a first container in the first virtual tape library. The first container includes a first base prefix and the namespace of the first cartridge includes the first base prefix.

The method further comprises storing, at a second server node, a replica of the backup data file corresponding to the first cartridge in a second virtual tape library residing on a second deduplication file system. The replica backup data file corresponds to a second cartridge stored in a second container in the second virtual tape library. The first base prefix is replicated to the second container such that the namespace of the second cartridge is the same as the namespace of the first cartridge.

The method further comprises assigning an activation code to the second container. The method further comprises re-serializing the first base prefix using the activation code to form a second base prefix such that the presentation of the second cartridge includes the second base prefix.

The method may further comprise accessing the replica backup data file in the second container via a data management application implemented on a client device. The method may further comprise storing, at a third server node, a replica of the backup data file corresponding to the first cartridge in a third virtual tape library residing on a third deduplication file system. The replica backup data file corresponds to a third cartridge stored in a third container in the third virtual tape library. The first base prefix is replicated to the third container such that the namespace of the third cartridge is the same as the namespace of the first cartridge;

The method may further comprise assigning an activation code to the third container, and re-serializing the first base prefix using the activation code to form a third base prefix such that the presentation of the third cartridge includes the third base prefix.

These and other embodiments are described further below with reference to the figures.

BRIEF DESCRIPTION OF THE DRAWINGS

The disclosure may best be understood by reference to the following description taken in conjunction with the accompanying drawings, which illustrate particular embodiments of the present disclosure.

DETAILED DESCRIPTION OF PARTICULAR EMBODIMENTS

Figure 1:
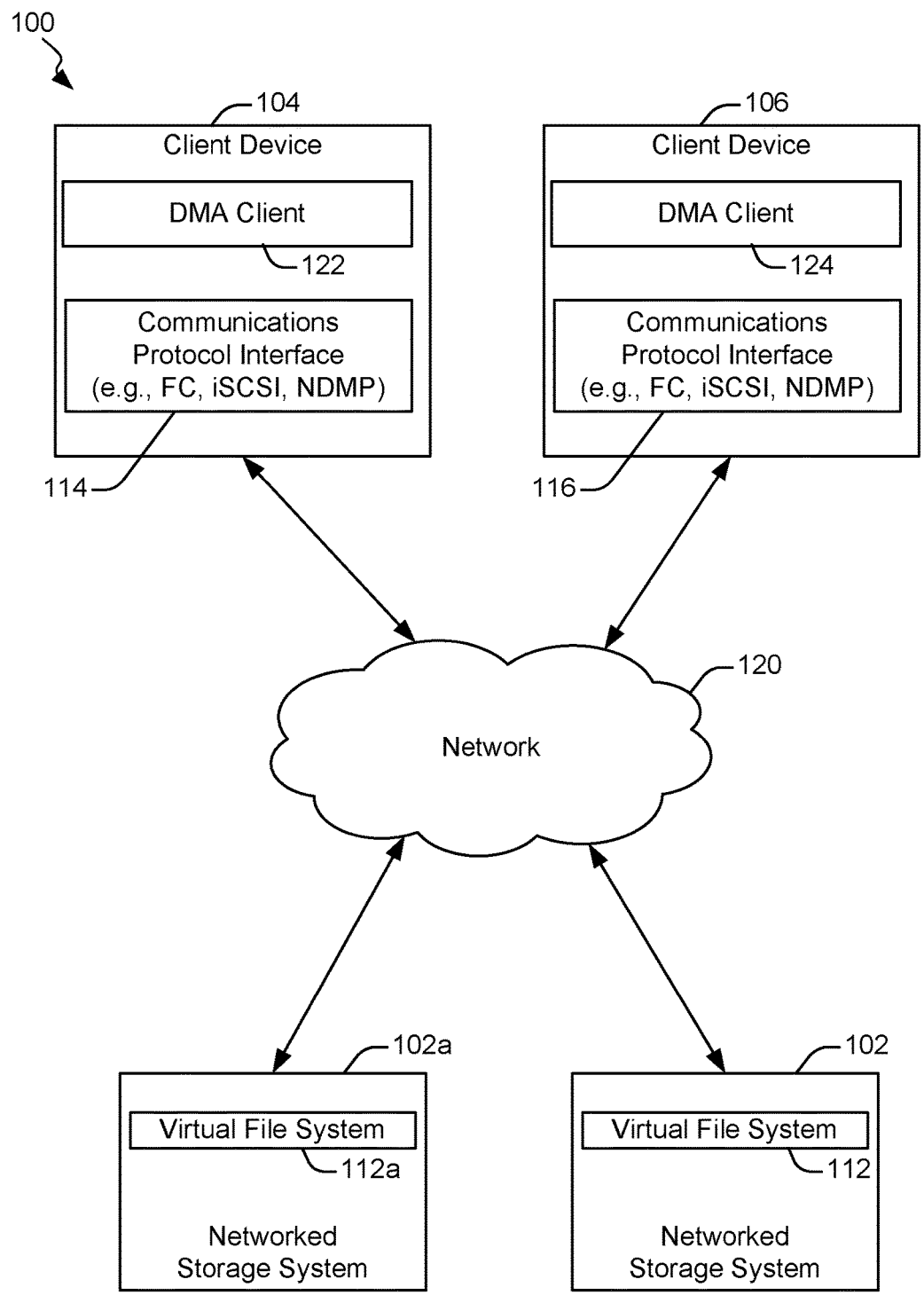
FIG. 1 illustrates an example of a network storage arrangement, arranged in accordance with one or more embodiments.

Reference will now be made in detail to some specific examples of the present disclosure including the best modes contemplated by the inventors for carrying out the present disclosure. Examples of these specific embodiments are illustrated in the accompanying drawings. While the present disclosure is described in conjunction with these specific embodiments, it will be understood that it is not intended to limit the present disclosure to the described embodiments. On the contrary, it is intended to cover alternatives, modifications, and equivalents as may be included within the spirit and scope of the present disclosure as defined by the appended claims.

For example, the techniques of the present disclosure will be described in the context of particular protocols, such as SCSI, NDMP, and Fibre Channel. However, it should be noted that the techniques of the present disclosure may apply to various other types of computer-based protocols. In the following description, numerous specific details are set forth in order to provide a thorough understanding of the present disclosure. Particular example embodiments of the present disclosure may be implemented without some or all of these specific details. In other instances, well known process operations have not been described in detail in order not to unnecessarily obscure the present disclosure.

Various techniques and mechanisms of the present disclosure will sometimes be described in singular form for clarity. However, it should be noted that some embodiments include multiple iterations of a technique or multiple instantiations of a mechanism unless noted otherwise. For example, a system uses a processor in a variety of contexts. However, it will be appreciated that a system can use multiple processors while remaining within the scope of the present disclosure unless otherwise noted. Furthermore, the techniques and mechanisms of the present disclosure will sometimes describe a connection between two entities. It should be noted that a connection between two entities does not necessarily mean a direct, unimpeded connection, as a variety of other entities may reside between the two entities. For example, a processor may be connected to memory, but it will be appreciated that a variety of bridges and controllers may reside between the processor and memory. Consequently, a connection does not necessarily mean a direct, unimpeded connection unless otherwise noted.

Overview

Because of the replication infrastructure and compatibility requirements with existing tape library protocols, two cartridges cannot be identically labeled and successfully resolved by a data management application during inventory and/or backup/restore processes. Nor can the file names of replicated files in a virtual tape library be simply renamed. Thus, the disclosed system and method provide a mechanism for dynamically re-serializing the serial numbers of containers, and corresponding cartridges and devices, within a replicated VTL for presentation to a data management application client.

According to various embodiments, a system, and corresponding method, for dynamically re-serializing replicated cartridges in a virtual tape library is provided. In various implementations, the method may be used for facilitating data backup and recovery in single- and multi-domain data networks. The system comprises multiple peer server nodes designed to store data files on a deduplication file system. While each peer server node is a disk drive, each peer server node includes a virtual tape library which emulates a traditional tape drive including tape cartridges, tape drives, and one or more other devices. This allows faster disk drives to be utilized while remaining compatible with existing tape libraries.

A client device implementing a data management application (DMA) may access the peer server nodes in order to access and/or write data onto the respective deduplication file systems. A first peer server node may store the backup data for a particular organization in a corresponding deduplication file system. The file system may store the backup data as a virtual tape library (VTL) within containers with corresponding emulated cartridges, tape drives, and other devices, each with unique serial numbers. The DMA views the virtual tape library, its tape drives and cartridges just like a physical tape library, tape drives and cartridges. The DMA uses various protocols to load a cartridge into a tape drive and write to the cartridge using SCSI command descriptor blocks. However, the writes to the cartridge are stored in a file within a container.

A second peer server node may store a replica of the backup data files for archival, additional backup, a disaster recovery mechanism, etc. The backup data files are stored within a deduplication file system on the second peer server node. The replication from the first peer server to the second peer server is a continuous process in which the peer server nodes maintain synchronicity of data files. During the replication process, the namespace of the original container, and corresponding cartridges and devices, are also replicated. However, in order to avoid malfunctions by the DMA during inventory and backup/restore processes, the replicated cartridges at the second peer server node must not be presented to the DMA with the same serial numbers as the original cartridges of the first peer server node.

An activation code may be assigned to the replicated container. When all files in both systems are in sync, the activation code is used to re-serialize the replicated container such that different serial numbers for the replicated cartridges are presented to the DMA while the namespace of the container and cartridges remain the same on the deduplication file system. Re-serialization may occur by using a salt algorithm to output a new serial number based on the original serial number and the activation code. This allows a replicated container to be recognized without having to disjoint the originating peer server and interrupting the continuous replication process.

Example Embodiments

Tape Library

A tape library (TL) (also referred to as tape silo, robot, or jukebox) generally comprises: a) numerous slots to hold tape cartridges, b) a barcode reader to identify tape cartridges that have bar codes printed on them, c) a robot for loading tapes into tape drives, and d) one or more tape drives. For example, a tape library may be a StorageTek™ STK L700 tape library which can hold up to 396 cartridges and several barcode label packs. Tape drives within the tape library may be an IBM™ Ultrium 3580-TD4 tape drive which supports LTO-4 cartridges.

The tape libraries can hold a huge amount of data ranging from 20 TB to couple of exabytes and a fully configured library can cost up to a million dollars. These are cost-effective solutions, with cost per gigabyte as low as 10 cents, 60% less than hard drives. However, due to their configuration access times can be up to minutes because manipulation of tapes requires mechanical movements (rewinding, linear seeking etc.). Therefore, owing to the slow sequential access and very high capacity, tape libraries are primarily used for backups or archiving. Several large-scale library-management packages are available, such as Amanda and Bacula. A simple management program may be mtx for Linux.

Tape libraries optically scan barcode labels which are attached to each tape, allowing them to automatically maintain an inventory of tapes and the position of those tapes. The barcode label is frequently part of the tape label information recorded at the beginning of the media to uniquely identify the tape. In various embodiments of the present disclosure, different tape labeling schemes may be utilized to conform to the re-serialization process further described below.

Existing tape libraries face several disadvantages. As previously described, slow access times may be caused by the mechanical configuration of tape libraries. However, increasing amounts of data within a company or business may require the backup of data to occur faster. Furthermore, robotic components of tape libraries may be prone to failure. Additionally, to increase backup performance, backups need to be multiplexed across multiple drives and tapes, which increases the odds of a failed backup due to a bad tape, a faulty drive or malfunctioning robotics.

Restores from tape are also time-consuming. For example, in recovering a file that is part of a 10-tape multiplexed backup, each of the tapes must be located and loaded into 10 different tape drives. Furthermore, tape media costs are high. Additionally, tape backups can be non-restorable in the future because media can go bad, and there is no RAID-like (redundant array of independent disks) technology deployed for tapes.

Virtual Tape Library (VTL)

Virtual tape is a concept that was introduced for IBM mainframes. Virtual Tape Libraries (VTLs) are logically just like physical tape libraries: they logically appear and operate just like tape libraries discussed above (physical tape devices including virtual tape drives, data cartridges, tape slots, barcode labels and robotic arms). It is physically an optimized disk-based storage appliance. Because it emulates a standard tape library, the introduction of virtual tape is seamless and transparent to existing tape backup/recovery applications. Thus, deploying a virtual tape library in place of a physical tape library does not disrupt any of the Data Management Application (DMA) setups in terms of policies.

A VTL may function as an archival backup solution that combines traditional tape backup methodology with low-cost disk technology to create an optimized backup and recovery solution. It is an intelligent disk-based library that emulates traditional tape devices and tape formats. Acting like a tape library with the performance of modern disk drives, data is deposited onto disk drives just as it would onto a tape library, only faster. Virtual tape backup solutions can be used as a secondary backup stage on the way to tape, or as their own standalone tape library solution. A VTL generally consists of a Virtual Tape appliance or server, and software which emulates traditional tape devices and formats.

VTLs may enjoy certain advantages over physical tape libraries. Performance is increased and backup window is decreased. A virtual tape library performs at disk level speeds. If it is intelligent, then the virtual performance is even more enhanced. For example, a VTL may support deduplication. If the backup stream contains duplicate occurrences of data, then the backup will complete faster. Recoveries may also be faster. Additionally, since VTLs do not have any mechanical components and is only a simulation, there are no delays incurred for loading tape or seeking to a position in tape (like a filemark or a block). A VTL may be implemented on top of a deduplication repository which is on top of a RAID-protected file system, reducing the chance of backup failure.

SCSI Interface

SCSI or the Small Computer System Interface is an American National Standards Institute (ANSI) standard that allows computers to communicate with peripheral hardware such as disks, tape drives, medium changers, CD-ROM drives, printers, and scanners faster than previous interfaces.

The original SCSI, now known as SCSI-1, evolved into SCSI-2 and became widely supported. SCSI-3 consists of a set of primary commands and additional specialized command sets to meet the needs of specific device types. The collection of SCSI-3 command sets is used not only for the SCSI-3 parallel interface but for additional parallel and serial protocols, including Fibre Channel, Serial Bus Protocol (used with the IEEE 1394 Firewire physical protocol), and the Serial Storage Protocol (SSP).

A TL usually supports the SCSI standard. In other embodiments, a TL may support other protocols described above, such as Fibre Channel. In SCSI terminology, the tape library and its components can appear as separate targets or a single target with various logical unit numbers (LUNs). Each LUN can represent a tape drive or a mover (or medium changer or robot).

SCSI commands may be supported for various peripheral types. The SCSI standard for commands for tape drives is SSC-3. The SCSI standard for commands applicable to medium changer device is SMC-3. Some of the commands are unique and some other commands are common. These commands may be referred to as Command Descriptor Blocks (CDBs).

SCSI Layers in Linux

The SCSI protocol may be implemented in various operating systems. In Linux, the SCSI subsystem uses a three layer design: upper, mid, and low layers. Every i/o (input/output) operation to a SCSI device, such as a disk, tape drive, medium changer or any abstracted device such as a RAID array (such as a SCSI target/LUN), involves the SCSI subsystem of Linux. The SCSI upper layer provides the interface between the user space and the kernel, in the form of block and char device nodes for I/O and ioctl( ) (input/output control). ioctl is a system call for device-specific input/output operations and other operations which cannot be expressed by regular system calls. It takes a parameter specifying a request code; the effect of a call depends completely on the request code.

The SCSI lower layer contains drivers for specific hardware devices such as Host Bus Adapters (HBAs). An HBA connects a computer, which acts as the host system, to other network and storage devices. For example, the LSI™ RAID controller is a SCSI HBA driver. Such driver may be used in a deduplicating repository server or other backup system, such as the Dell DR6000 series of storage appliances. The SCSI mid-layer is like the IPv4 stack. The SCSI mid-layer routes CDBs (command descriptor blocks) between the layer's /dev nodes and the corresponding devices in the lower layer. It manages command queues, provides error handling and power management functions, and responds to ioctl( ) requests. SCSI error handling is very complex and is very succinctly handled by the mid layer.

General System Architecture

FIG. 1 shows an example of a network storage arrangement of a system 100, arranged in accordance with one or more embodiments. The network storage arrangement shown in FIG. 1 includes a networked storage systems 102 and 102a in communication with client devices 104 and 106 via a network 120. The client devices are configured to communicate with the networked storage system 102 and/or 102a via the communications protocol interfaces 114 and 116. The networked storage systems 102 and 102a are configured to process file-related requests from the client devices via the virtual file system (VFS) 112 and 112a, respectively.

According to various embodiments, the client devices and networked storage systems shown in FIG. 1 may communicate via a network 120. The network 120 may include any nodes or links for facilitating communication between the end points. For instance, the network 120 may include one or more WANs, LANs, MANs, WLANs, or any other type of communication linkage, wired and/or wireless.

In some implementations, the networked storage system 102 and/or 102a may be any network-accessible device or combination of devices configured to store information received via a communications link. For instance, the networked storage systems 102 and/or 102a may include one or more DR6000 and/or DR4000 series of storage appliances provided by Dell Computer of Round Rock, Tex.

In some embodiments, the networked storage systems 102 and 102a may be operable to provide one or more storage-related services in addition to simple file storage. For instance, the networked storage systems 102 and 102a may be configured to provide deduplication services for data stored on the storage system. Alternately, or additionally, the networked storage systems 102 and 102a may be configured to provide backup-specific storage services for storing backup data received via a communication link, such as for data archival and/or data backup or restoration. In some embodiments, networked storage systems 102 and 102a may implement a virtual tape library on top of the deduplication file system (further described below).

In some embodiments, system 100 may comprise a single-domain data network, in which the client devices and networked storage systems are located within the same site. In some embodiments, the system 100 may comprise a multi-domain data network in which one or more networked storage systems are located at different sites from one or more client devices. In various embodiments, networked storage system 102a may receive data and communications directly from client devices 104 and/or 106 via network 120. In some embodiments, networked storage system 102a may receive data and communications directly from networked storage system 102, via network 120. Although FIG. 1 shows two networked storage systems, other network storage arrangements may include any number of networked storage systems.

According to various embodiments, each of the client devices 104 and 106 may be any computing device configured to communicate with the networked storage system 102 via a network or other communications link. For instance, a client device 104 and/or 106 may be a desktop computer, a laptop computer, another networked storage system, a mobile computing device, or any other type of computing device. Although FIG. 1 shows two client devices, other network storage arrangements may include any number of client devices. For instance, corporate networks often include many client devices in communication with the same networked storage system.

In some embodiments, system 100 may include Data Management Application (DMA) clients, such as 122 and 124, within client devices. In some embodiments, the DMA clients 122 and/or 124 may be an NDMP client, such as NetBackup, which is an enterprise level heterogeneous backup and recovery suite that provides cross-platform backup functionality to a large variety of Windows, UNIX and Linux operating systems. Other DMAs may be alternatively implemented in other embodiments.

According to various embodiments, the client devices may communicate with the networked storage system 102 via the communications protocol interfaces 114 and 116. In various embodiments, these communication protocols may include Fiber Channel (FC), Internet Small Computer System Interface (iSCSI) (which is the SCSI protocol mapped to TCP/IP and run over standard Ethernet technologies), Network Data Management Protocol (NDMP), etc. The DMA Client software 122 and/or 124 accesses VTL devices (library and tape drives; further described below) on the networked storage systems 102 and/or 102a via these protocols. Different client devices may employ the same communications protocol interface or may employ different communications protocol interfaces. The communications protocol interfaces 114 and 116 shown in FIG. 1 may function as channel protocols that include a file-level system of rules for data exchange between computers. For example, a communications protocol may support file-related operations such as creating a file, opening a file, reading from a file, writing to a file, committing changes made to a file, listing a directory, creating a directory, etc. Types of communication protocol interfaces that may be supported may include, but are not limited to: Network Data Management Protocol (NDMP), Small Computer System Interface (SCSI), Fibre Channel (FC), Network File System (NFS), Common Internet File System (CIFS), Server Message Block (SMB), Open Storage (OST), Web Distributed Authoring and Versioning (WebDAV), File Transfer Protocol (FTP), Trivial File Transfer Protocol (TFTP).

In some implementations, a client device may communicate with a networked storage system using the NFS protocol. NFS is a distributed file system protocol that allows a client computer to access files over a network in a fashion similar to accessing files stored locally on the client computer. NFS is an open standard, allowing anyone to implement the protocol. NFS is considered to be a stateless protocol. A stateless protocol may be better able to withstand a server failure in a remote storage location such as the networked storage system 102. NFS also supports a two-phased commit approach to data storage. In a two-phased commit approach, data is written non-persistently to a storage location and then committed after a relatively large amount of data is buffered, which may provide improved efficiency relative to some other data storage techniques.

In some implementations, a client device may communicate with a networked storage system using the CIFS protocol. CIFS operates as an application-layer network protocol. CIFS is provided by Microsoft of Redmond Washington and is a stateful protocol. In some embodiments, a client device may communicate with a networked storage system using the OST protocol provided by Symantec NetBackup.

In some embodiments, different client devices on the same network may communicate via different communication protocol interfaces. For instance, one client device may run a Linux-based operating system and communicate with a networked storage system via NFS. On the same network, a different client device may run a Windows-based operating system and communicate with the same networked storage system via CIFS. Then, still another client device on the network may employ a NetBackup backup storage solution and use the OST protocol to communicate with the networked storage system 102.

According to various embodiments, the virtual file system layers (VFS), such as VFS 112, are configured to provide an interface for client devices using potentially different communications protocol interfaces to interact with protocol-mandated operations of the networked storage system 102. As later described in FIG. 2, this VFS layer may be Ocarina File System (OCAFS) 276. For instance, the virtual file system 112 may be configured to send and receive communications via NFS, CIFS, OST or any other appropriate protocol associated with a client device.

According to various embodiments, when a Virtual Tape Library server is in front of a VFS, such as VFS 112, the networked storage system 102 and/or 102a is capable of communicating with client devices ( 106 and/or 104 ) using FC, NDMP or iSCSI protocols which internally carry SCSI payloads. Internally, the Virtual Tape Library server may create and store files in the virtual file system 112 to represent cartridges.

In some implementations, the network storage arrangement shown in FIG. 1 may be operable to support a variety of storage-related operations. For example, the client device 104 may use the communications protocol interface 114 to create a file on the networked storage system 112, to store data to the file, to commit the changes to memory, and to close the file. As another example, the client device 106 may use the communications protocol interface 116 to open a file on the networked storage system 102, to read data from the file, and to close the file.

In particular embodiments, a communications protocol interface 114 may be configured to perform various techniques and operations described herein. For instance, a customized implementation of an NFS, CIFS, or OST communications protocol interface may allow more sophisticated interactions between a client device and a networked storage system.

According to various embodiments, a customized communications protocol interface may appear to be a standard communications protocol interface from the perspective of the client device. For instance, a customized communications protocol interface for NFS, CIFS, or OST may be configured to receive instructions and provide information to other modules at the client device via standard NFS, CIFS, or OST formats. However, the customized communications protocol interface may be operable to perform non-standard operations such as a client-side data deduplication.

Virtual Tape Library (VTL) System Architecture

Figure 2:
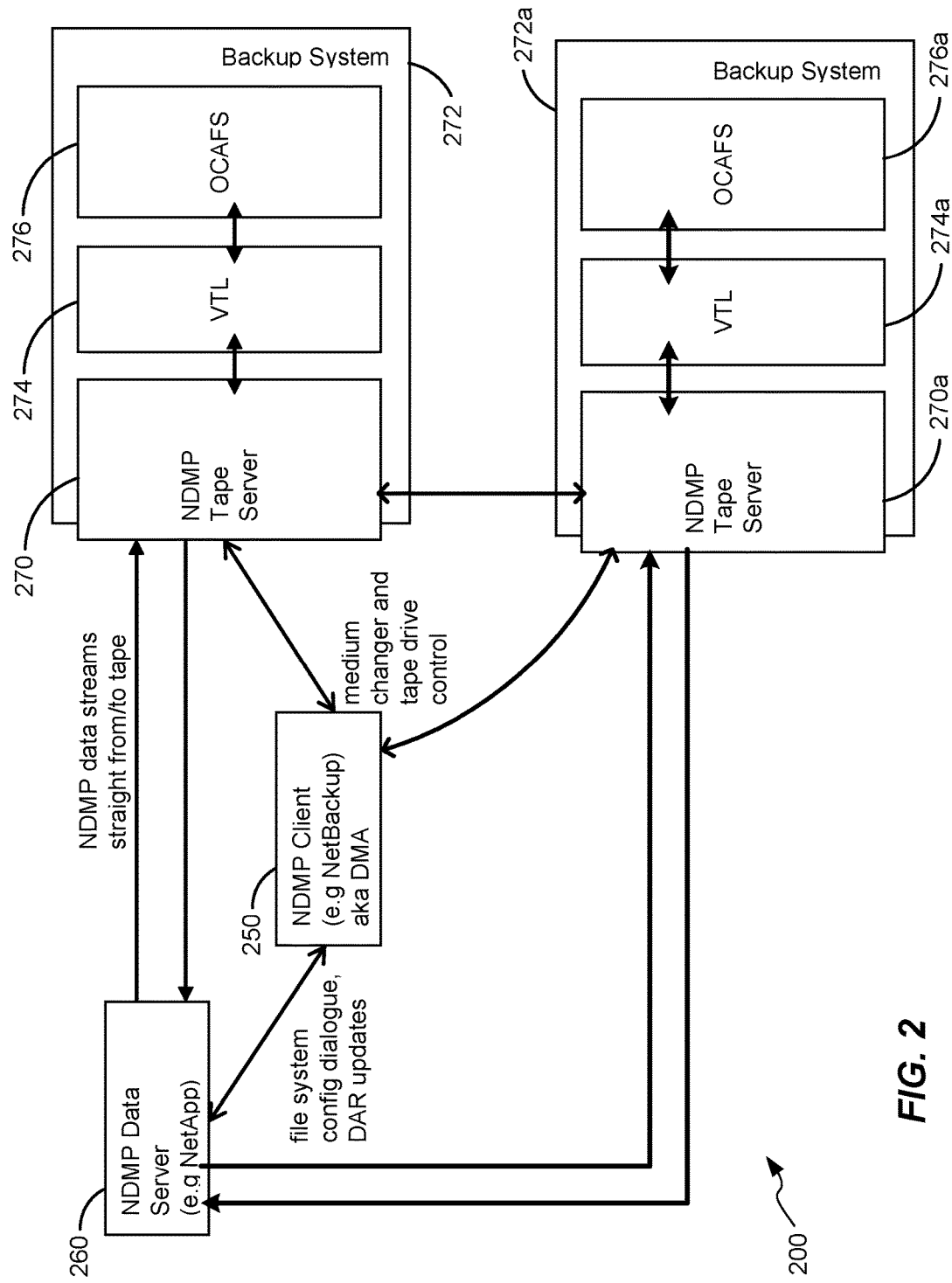
FIG. 2 illustrates a diagram of an example network architecture for implementing various systems and methods of the present disclosure, in accordance with one or more embodiments.

FIG. 2 illustrates a diagram of an example network architecture of a virtual tape library system 200, in accordance with one or more embodiments. FIG. 2 highlights the NDMP protocol, and the placement of an NDMP Tape Server 270 and VTL 274 in the system 200 is depicted. FIG. 2 illustrates a three way NDMP backup, as described above, to a backup system 272. Shown are an NDMP DATA Server 260 running on a Network Attached Storage device (e.g. NetApp), an NDMP client 250 of both the data server (DS) and tape server (TS) (e.g. NetBackup DMA client 122 and/or 124), and an NDMP TAPE Server 270 running on a backup system 272. In some embodiments, the NDMP client 250 may be implemented on a client device, such as client device 104 and/or 106. In some embodiments, the backup system 272 may be networked storage system 102 and/or 102a. The NDMP client 250, NDMP data server 260, and NDMP tape server 270 may be connected via a network, such as network 120 discussed in conjunction with FIG. 1.

In some embodiments, system 200 may include a second backup system 272a, which is also communicably connected to NDMP client 250 and NDMP data server 260 via the network 120. In some embodiments, each backup system 272 and/or 272a may comprise of a storage appliance, such as the Dell DR 6000 series of storage appliances. In some embodiments, backup systems 272 and 272a may be located within the same networked storage system, such as networked storage system 102. In other embodiments, backup system 272a may be located within a different storage system than backup system 272, such as in networked storage system 102a.

NDMP (Network Data Management Protocol) is a protocol used to control data backup and recovery between primary and secondary storage in a network environment, such as system 100 and/or system 200. For example, a Network Attached Storage (NAS) server (e.g., NetApp) running an NDMP DATA Server 260 can communicate with a tape drive for the purposes of a backup.

Prior to NDMP, administrators remotely mounted the NAS volumes on a server and backed up or restored the files to and/or from a directly attached tape drive or a tape library. With the advent of NDMP, a centralized program, such as a DMA (Database Management Application), could use the protocol to back up data on file servers running on different platforms to tape drives or tape libraries located elsewhere within the network. The protocol separates the data path from the control path and minimizes demands on network resources. With NDMP, a network file server 260 (such as NetApp) can communicate directly to a network-attached tape drive or tape library such as the tape drive 272 for backup or recovery, as described further in conjunction with FIG. 2.

This protocol was developed by NetApp Inc., but the list of data backup DMA software and hardware vendors that support the protocol has grown over the years. Currently, the Storage Networking Industry Association (SNIA) owns development of the protocol.

The NDMP protocol specifies two different services:

DATA server 260 (DS): This service traverses a file system (on a NAS server such as NetApp) and produces an NDMP data stream (in a particular interchange format such as TAR or DUMP etc.) OR reads an NDMP data stream and extracts files back.

TAPE server 270 (TS): This service reads an NDMP data stream and writes it to tape or reads from tape and writes an NDMP data stream. All tape-handling functions, such as split-images, tape overflow, etc. are handled here. The TAPE server 270 implements a mover state machine that handles loading tapes into tape drives, positioning on tapes, etc. All these operations can be controlled by the NDMP client 250 (e.g. a DMA such as NetBackup). NDMP messages are grouped into: a) SCSI, b) CONFIG, and c) TAPE.

The SCSI interface allows an NDMP client 250 (e.g., a DMA such as NetBackup) to pass SCSI CDBs (command descriptor blocks) to the SCSI tape library that is on the same physical machine (the Backup System 272) where the NDMP TAPE server 270 is running. The TAPE interface allows the client 250 to position tape and read/write tape labels, etc.

NDMP v2 allows directing the NDMP data stream from one NDMP Data server 260 (e.g. NetApp) via TCP/IP connection to a NDMP TAPE server 270 on a backup system 272. The remote NDMP server 260 accesses the tape locally. This is known as 3-way backup, since typically 3 hosts are involved:

The host running the NDMP client 250 (e.g., a DMA such as NetBackup)

The host running the NDMP DATA server 260 (e.g., NetApp)

The host running the NDMP TAPE server 270 (e.g., Dell DR6000)

Some of the NDMP operations involved may include a SCSI Interface. For example:

1. NDMP_SCSI_OPEN: Opens the specified SCSI device. This operation is REQUIRED before any other SCSI requests may be executed.

2. NDMP_SCSI_CLOSE: This request closes the currently open SCSI device. No further requests SHALL be made until another open request is successfully executed.

3. NDMP_SCSI_GET_STATE: This request returns the current state of the

SCSI interface. The target information provides information about which SCSI device is controlled by this interface.

4. NDMP_SCSI_RESET_DEVICE: This is an optional request that sends a SCSI device reset message to the currently opened SCSI device.

5. NDMP_SCSI_EXECUTE_CDB: This request sends a SCSI Control Data Block to a SCSI device. If a check condition is generated, then the extended sense data is also retrieved.

Another NDMP operation involved includes a Tape Interface. For example:

1. NDMP_TAPE_OPEN: This request opens the tape device in the specified mode. This operation is required before any other tape requests can be executed.

2. NDMP_TAPE_CLOSE: This request closes the tape drive. For this request to succeed, any MOVER using this tape device MUST be not either in an active or a listen state.

3. NDMP_TAPE_GET_STATE: This request returns the state of the tape drive interface.

4. NDMP_TAPE_MTIO: This request provides access to common magnetic tape I/O operations.

5. NDMP_TAPE_WRITE: This request writes data to the tape device. The number of tape blocks written depends on the mode of the tape drive.

In variable block size mode, the NDMP server writes <count> bytes of data to one tape block.

In fixed block size mode, the NDMP server writes the data to the number of tape blocks computed as specified earlier. It is the client's responsibility to ensure that <count> is a multiple that fixed block size.

6. NDMP_TAPE_READ: This request reads data from the tape drive. The number of tape blocks read depends on the mode of the tape drive. See NDMP_TAPE_WRITE.

7. NDMP_TAPE_EXECUTE_CDB: This message behaves in exactly the same way as the SCSI_EXECUTE_CDB request except that it sends the CDB to the tape device. This request SHOULD not be used to change the state of the tape device (such as tape positioning).

The DMA 250 uses its NDMP client components to communicate with both the Data Server 260 and Tape Server 270. The DMA 250 may communicate with the Data Server 260 in order to request, receive, and/or retrieve a list of file systems to backup, etc. The DMA 250 may also advise the Data Server 260 to prepare an NDMP data stream (basically a TAR or DUMP interchange stream of the file system).

The DMA 250 may also communicate with the Tape Server 270 on the Backup System 272 to inquire about what medium changer and tape drives are available, as well as how many cartridges are loaded in the VTL 274. The protocol may transport SCSI CDBs defined in SMC-3, as previously described. For example, READ ELEMENT STATUS provides cartridge inventory. Other SMC-3 commands may include EXCHANGE MEDIUM, INITIALIZE ELEMENT STATUS, MOVE MEDIUM, POSITION TO ELEMENT, READ ATTRIBUTE etc. The MOVE MEDIUM and MOVE MEDIUM ATTACHED commands request that the device server move a volume from a source element (cartridge) to a destination element (tape drive).

Once a cartridge is ready in a TAPE drive, it might position to end-of-data on tape and write a FILEMARK on tape to indicate the start of a new backup. It then asks the Tape Server 270 to supply an open port—the port is capable of accepting an NDMP data stream.

The client 250 forwards the network address and port to the Data Server 260 at this point and advises the Data Server 260 to start pumping its NDMP data stream straight to the port in the Tape Server 270. The Tape Server 270 channels the NDMP data stream straight to tape. This obviates the DMA 250 middleman and therefore enhances performance. While the Data Server 260 accelerates the NDMP data stream to the Tape Server 270, the Data Server 260 also supplies file position information (position within the stream) to the DMA 250 so that it can aid in a faster future restore by positioning closer to the file on tape. This is called DAR or Direct Access Restore. Once the NDMP data stream is completed, the DMA 250 wraps up by writing a FILE-MARK on tape, and may unload the tape and perform other housekeeping.

The Backup System 272 may include two components, including the NDMP Tape Server 270 and VTL 274. Various software may be integrated into and leveraged for Backup System 272. Such software may include DinoStor Tape Server (further depicted in FIG. 3), which may be provided at an object level by a vendor, and may be compiled in the build infrastructure.

In some embodiments, there may be an additional peer server node functioning as a second Backup System 272a. Backup System 272a may also include an NDMP Tape Server 270a, a VTL component 274a, and a deduplication file system 276a, such as OCAFS. In some embodiments, VTL system 200 may be implemented on a single-domain file system network. In a single-domain data network, the DMA 250 implemented on a client device 104 and/or 106 has access to the original VTL 274 and the second replicated VTL 274a. In other embodiments, VTL system 200 may be implemented on a multi-domain file system network. In a multi-domain network one or more DMAs 250 and/or backup systems, such as 272a, may be remotely located offsite from the backup system 272 containing the original VTL 274. Peer backup systems may communicate to remain in synch; however, a remote DMA may only have access to the backup system located at the same site.

Representation of Cartridges on a VTL

The tape drive, medium changer, and the cartridges of a traditional tape library are emulated by software on a VTL, such as VTL 274 and/or 274a. In some embodiments, emulation of devices and cartridges occur via emulation daemons. Cartridges are the emulations of tape cartridges, such as LTO- 4 cartridge, that contain the backup data. In some embodiments, a cartridge is a file in the OCAFS 276 (Ocarina File System). The VTL may appear to the DMA 250 as a real physical tape drive and a cartridge may appear as magnetic media loaded into a tape drive. As the DMA 250 writes to the tape drive, it transmits data in the form of a SCSI command descriptor block (through NDMP, FC or iSCSI). Such data is then written to the emulated cartridge by the VTL 274, in which it is stored as a directory and files in the deduplicating file system, OCAFS 276. The cartridges need to be in the OCA deduplication repository 276 (OCAFS) and have the following described properties.

A container is a subset of the OCAFS file system that is designed to hold a number of files (cartridges). In various embodiments, a container may be accessed by various file system protocols, such as NFS and CIFS. A cartridge may be represented as a directory with a set of files residing within a container. It includes metadata files that may be used by VTL emulation daemons.

Since cartridges in the VTL 274 emulate LTO-4 cartridges available in the market, such emulated cartridges may have a fixed maximum size. Physical cartridges may have bar codes that are unique across a customer deployment, thus, a nomenclature scheme is important. Emulated cartridges must be contained within a container to be replicated. A cartridge from one container can be moved to another container (a feature needed for archival purposes).

For example, a cartridge with a bar code of NDEIEX_001 belonging to OCAFS container "vtl" may use the following namespace within that container:

```
/containers/vtl:
    +-- carts
        +-- NDEIEX_001
            +-- data      ← actual backup data is stored here
            +-- metadata  ← metadata file
```

As described above, a cartridge with directory serial number NDEIEX_001 is stored within container "vtl" and includes a data file, which contains the data that the DMA 250 sent via SCSI command. There is also a "metadata" file which contains various cartridge related information, such as data tree structure, where the last write occurred, and the location of "file marks", which are special markers placed on tape media.

Integration of VTL with OCAFS

OCAFS 276 is a deduplication file system used to store the backup data. It is the primary core that deduplicates incoming data in the Dell|Ocarina systems such as DR6000. In some embodiments, other file systems, such as New Technology File System (NTFS), may additionally and/or alternatively be used. In various embodiments, the file system, such as OCAFS 276 may function as a deduplication repository.

In computing, data deduplication is a specialized data compression technique for eliminating duplicate copies of repeating data. Deduplication techniques may be used to improve storage utilization or network data transfers by effectively reducing the number of bytes that must be sent or stored. In the deduplication process, unique data blocks of data, or byte patterns, are identified and stored during a process of analysis. As the analysis continues, other data blocks are compared to the stored copy and a redundant data block may be replaced with a small reference that points to the stored data block. Given that the same byte pattern may occur dozens, hundreds, or even thousands of times, the amount of data that must be stored or transferred can be greatly reduced. The match frequency may depend at least in part on the data block size. Different storage systems may employ different data block sizes or may support variable data block sizes.

Deduplication differs from standard file compression techniques. While standard file compression techniques typically identify short repeated substrings inside individual files, storage-based data deduplication involves inspecting potentially large volumes of data and identify potentially large sections—such as entire files or large sections of files—that are identical, in order to store only one copy of a duplicate section. In some instances, this copy may be additionally compressed by single-file compression techniques. For example, a typical email system might contain 100 instances of the same one megabyte (MB) file attachment. In conventional backup systems, each time the system is backed up, all 100 instances of the attachment are saved, requiring 100 MB storage space. With data deduplication, the storage space required may be limited to only one instance of the attachment. Subsequent instances may be referenced back to the saved copy for deduplication ratio of roughly 100 to 1.

Figure 3:
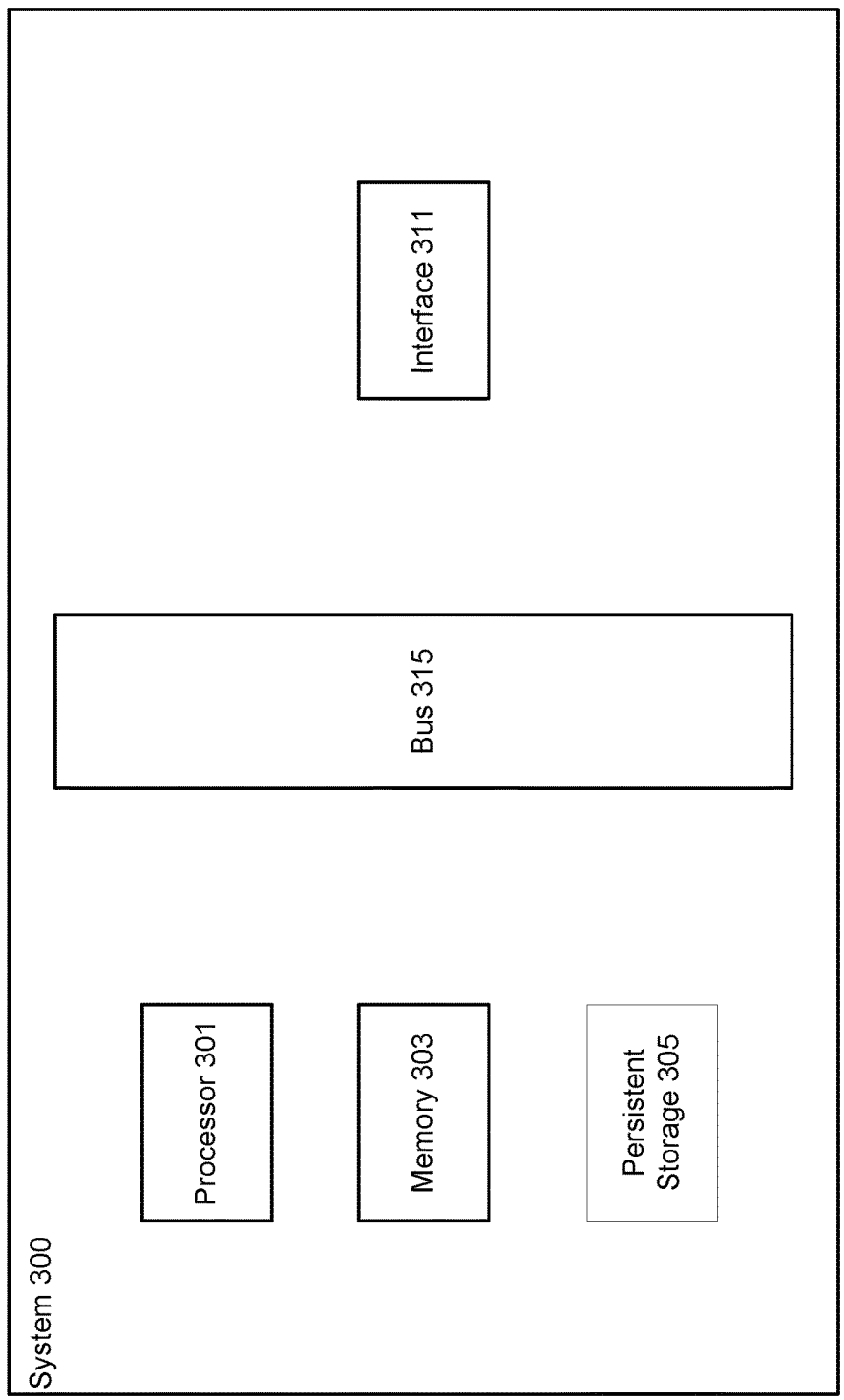
FIG. 3 illustrates a particular example of a system that can be used in conjunction with the techniques and mechanisms disclosed herein.

FIG. 3 illustrates a particular example of a system 300 that can be used in conjunction with the techniques and mechanisms disclosed herein. In some embodiments, system 300 may be backup system 272 and/or 272a. According to particular example embodiments, a system 300 suitable for implementing particular embodiments includes a processor 301, a memory 303, an interface 311, persistent storage 305, and a bus 315 (e.g., a PCI bus). For example, the system 300 may act as a client device such as the client device 104 or the client device 106 shown in FIG. 1. When acting under the control of appropriate software or firmware, the processor 301 is responsible for such tasks such as generating instructions to store or retrieve data on a remote storage system. Various specially configured devices can also be used in place of a processor 301 or in addition to processor 301. The complete implementation can also be done in custom hardware.

The interface 311 is typically configured to send and receive data packets or data segments over a network. Particular examples of interfaces the device supports include Ethernet interfaces, frame relay interfaces, cable interfaces, DSL interfaces, token ring interfaces, and the like. Persistent storage 305 may include disks, disk arrays, tape devices, solid state storage, etc.

In addition, various very high-speed interfaces may be provided such as fast Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control such communications intensive tasks as packet switching, media control and management.

According to particular example embodiments, the system 300 uses memory 303 to store data and program instructions and maintain a local side cache. The program instructions may control the operation of an operating system and/or one or more applications, for example. The memory or memories may also be configured to store received metadata and batch requested metadata.

Because information and program instructions may be employed to implement the systems/methods described herein, the present disclosure relates to tangible, or non-transitory, machine readable media that include program instructions, state information, etc. for performing various operations described herein. Examples of machine-readable media include hard disks, floppy disks, magnetic tape, optical media such as CD-ROM disks and DVDs; magneto-optical media such as optical disks, and hardware devices that are specially configured to store and perform program instructions, such as read-only memory devices (ROM) and programmable read-only memory devices (PROMs). Examples of program instructions include both machine code, such as produced by a compiler, and files containing higher level code that may be executed by the computer using an interpreter.

Replication of VTL to Peer Backup Systems

In some embodiments, the data stored on a VTL system, such as Backup System 272, may be replicated onto a peer Backup System 272a for additional archival purposes. Such replication is available in the Backup System 272 as an independent feature.

As previously described, tape drives and the medium changer are SCSI devices. These are exported externally from the de-duplication system (appliance) via iSCSI, NDMP and FC protocol. These emulated tape drives, medium changer and cartridges may be uniquely identified by unique serial numbers. Backup software (e.g., DMA 250 ) uses the serial number of the cartridge to keep track of backup sets.

However, because the VTL 274 is an emulation of actual physical devices, a replicated cartridge in VTL 274 a with the same serial number as the original cartridge from VTL 274 will cause a conflict in the DMA 250. The DMA 250 would read the serial numbers and determine that the cartridge is in two locations and will not be able to resolve the cartridges during inventory processes, as well as backup/restore processes. However, it is possible with the DMA 250 to have two different cartridges (of different serial numbers) co-exist that have the same data.

Because of the replication infrastructure, file names of replicated files cannot be simply renamed. Thus, the disclosed system and method provide a mechanism for dynamically re-serializing the serial numbers of containers, and corresponding cartridges and devices, within a VTL for presentation to an NDMP client.

Figure 4:
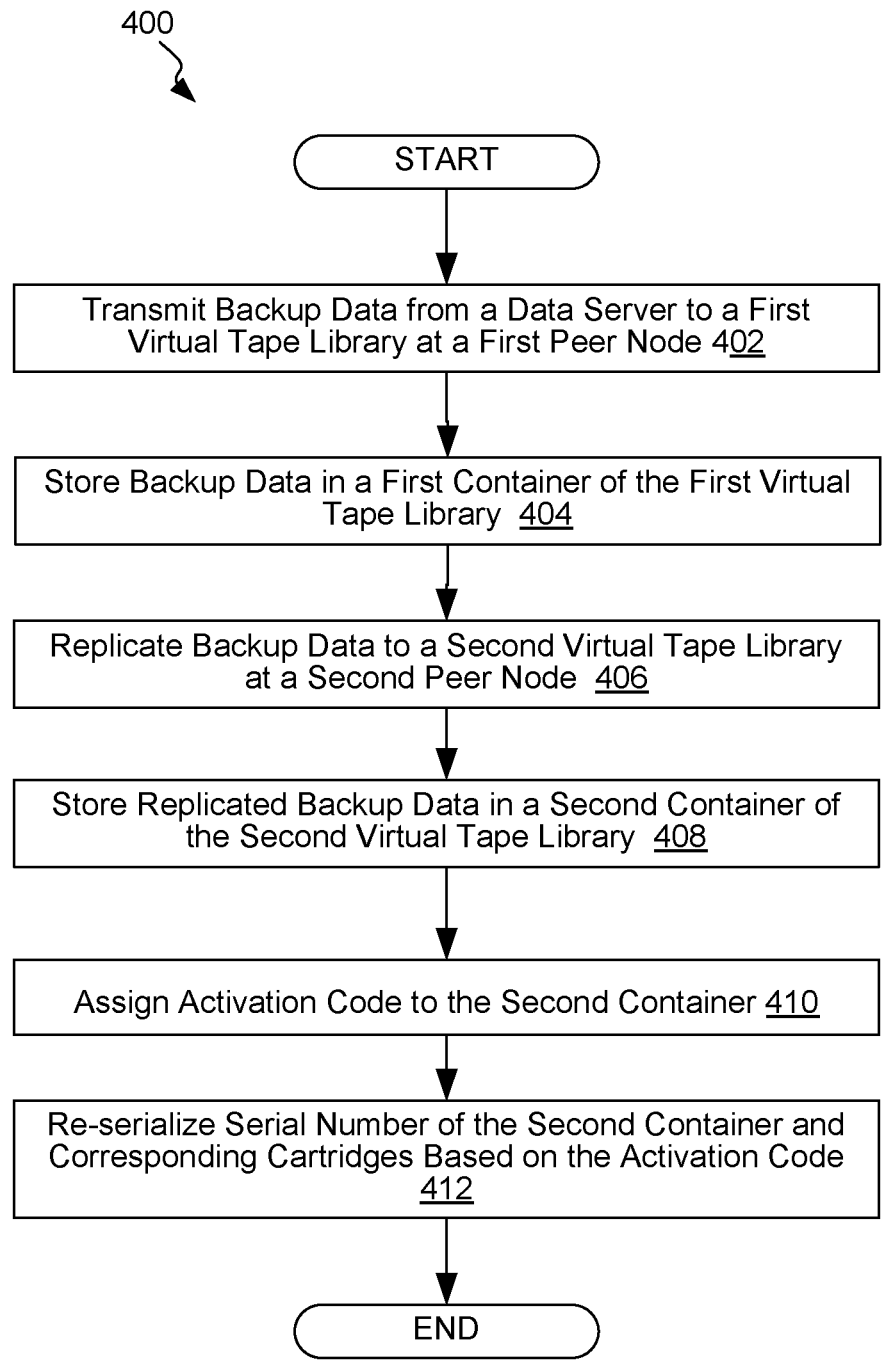
FIG. 4 illustrates a process flowchart corresponding to an example method for dynamically re-serializing cartridges in a replicated virtual tape library, in accordance with one or more embodiments.
Figure 5A:
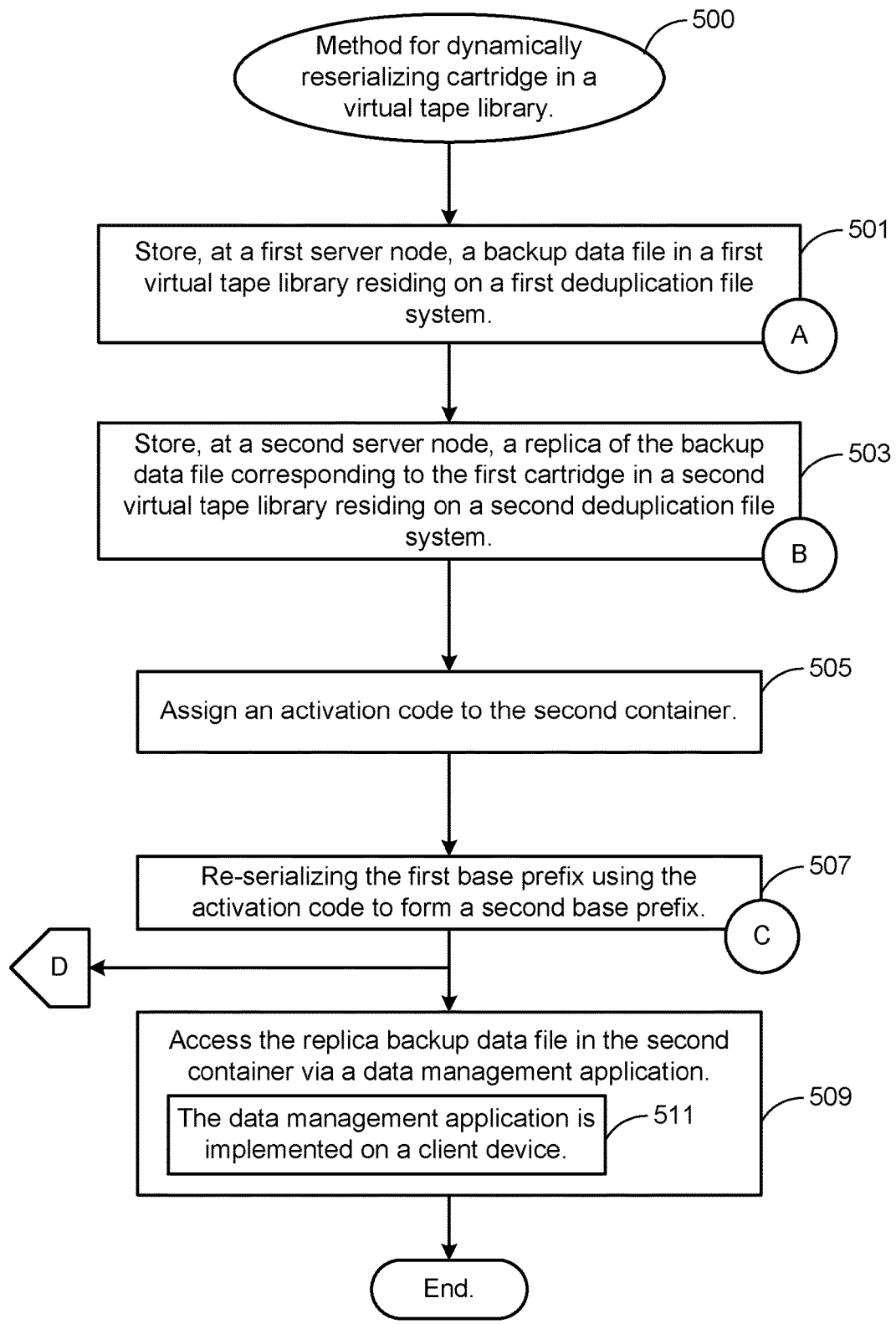
FIGS. 5A-5D illustrate another example method for dynamically re-serializing cartridges in a replicated virtual tape library, in accordance with one or more embodiments.
Figure 5B:
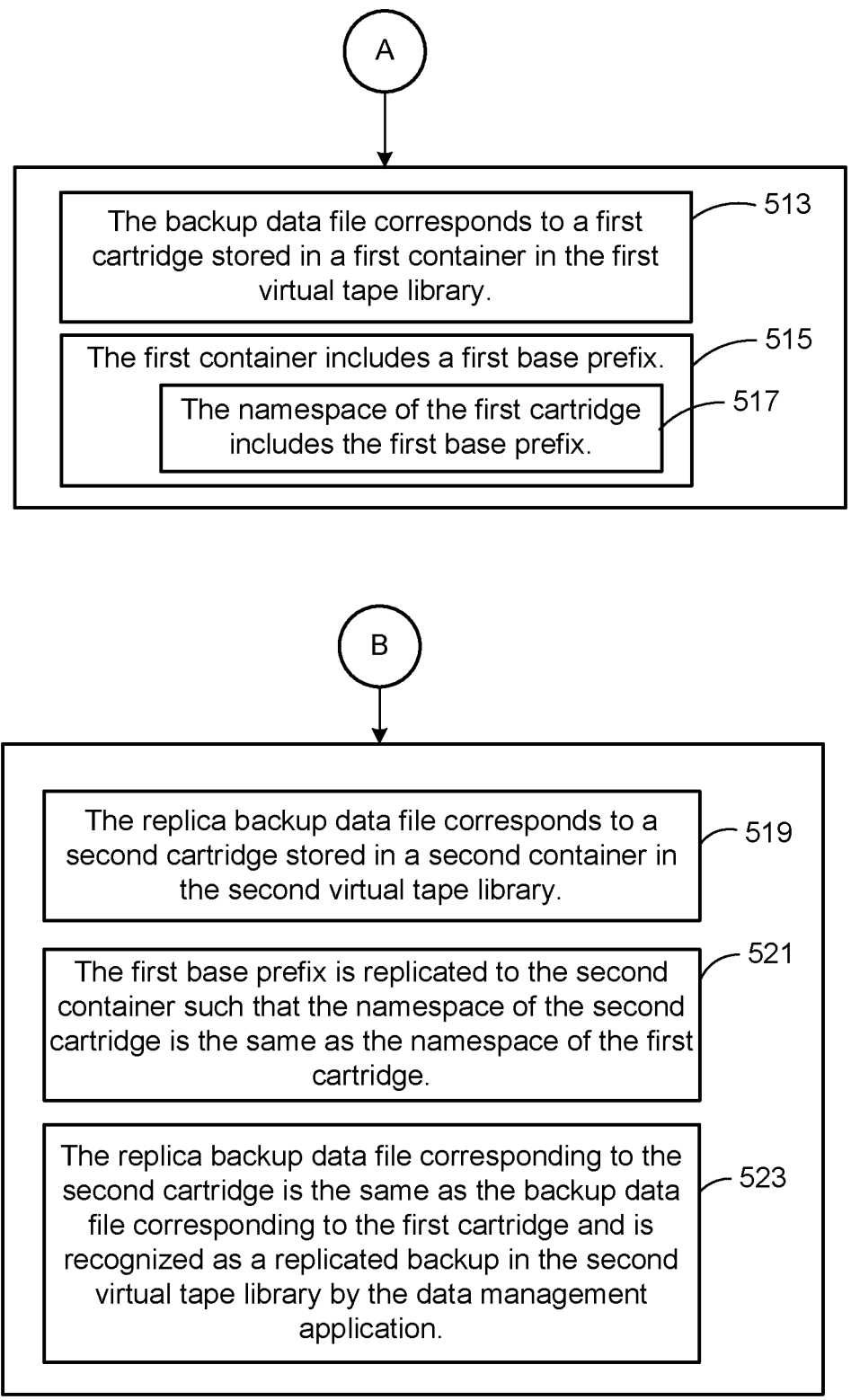
Figure 5C:
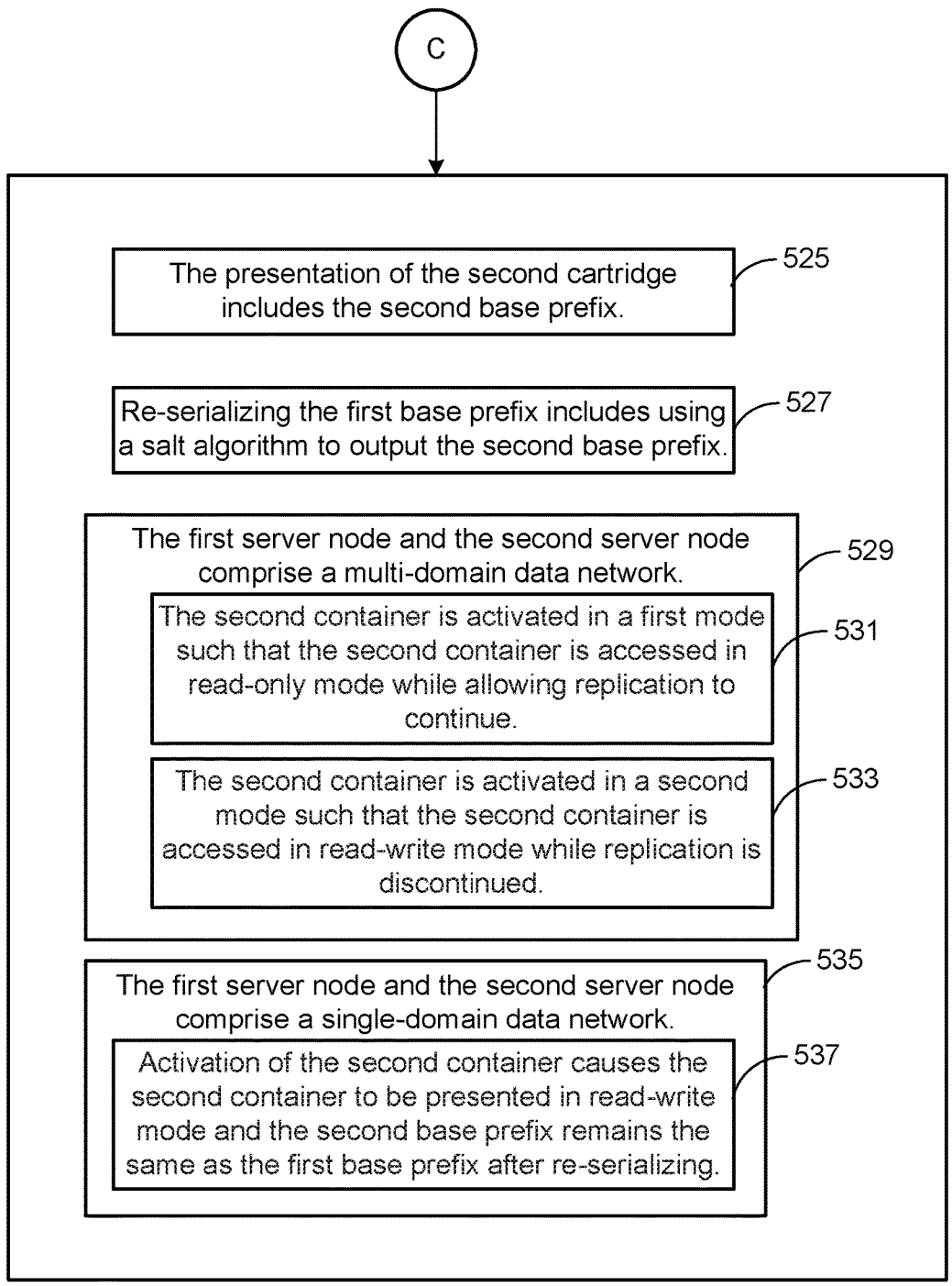
Figure 5D:
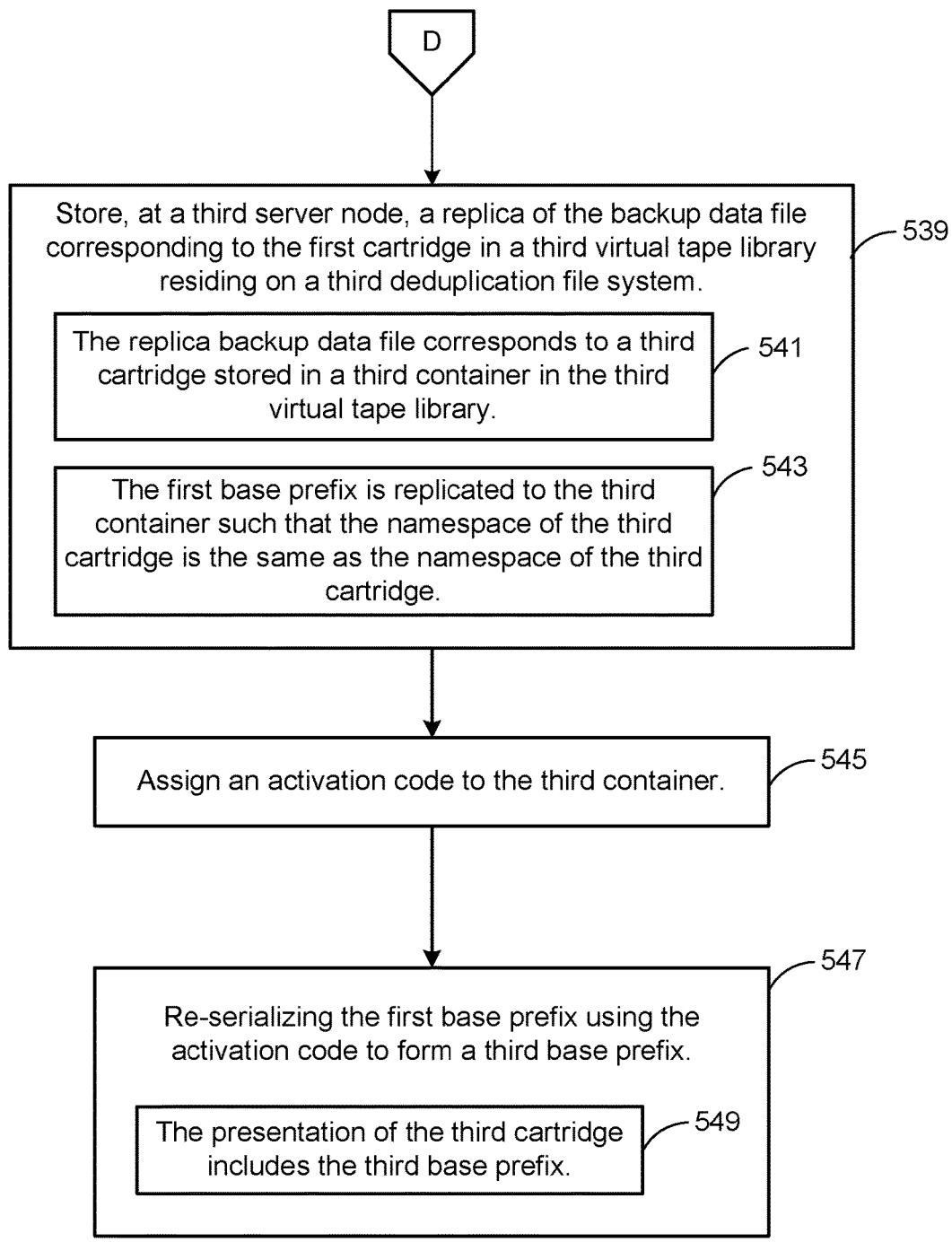

FIG. 4 illustrates a process flowchart corresponding to an example method 400 for dynamically re-serializing cartridges in a replicated virtual tape library, in accordance with one or more embodiments. At step 402, backup data is transmitted from a data server, such as data server 260. The data may be transmitted to a first virtual tape library at a first peer node. In some embodiments, the first peer node may be backup system 272. As such, the first peer node may include NDMP tape server 270, VTL 274, and OCAFS 276. As previously described in conjunction with FIG. 2, the DMA 250 may facilitate such data transfer by communicating with both the data server 260 and tape server 270 causing the data server 260 to transmit an NDMP data stream to an available port in the tape server 270 of backup system 272.

At step 404, the backup data is stored in a first container of the first virtual tape library. As previously described, the first container is a subset of the OCAFS file system 276 in the first backup system 272. The backup data may be stored in the OCAFS 276 as one or more cartridges of the first container. The first container may also include corresponding tape drives, and other devices, each with unique serial numbers.

As previously described, the first container, and corresponding cartridges and devices, may include a namespace based on unique serial numbers. For example, the first container may include a cartridge of size 800 GB. The first container may include a BASE of NDEIEX. Thus, serial numbers of tape drives, library, and cartridges are also prefixed with the base NDEIEX. As such, the DMA 250 controlling the VTL 274 has discovered ten tape drives with serial numbers NDEIEX_{01-09}, a tape library with a serial number of NDEIEX_00 and inventoried 999 cartridges with serial numbers of NDEIEX {001-999}. As in the example previously described, a cartridge in the first container may be labeled as NDEIEX_001.

At step 406, the backup data stored in the first VTL 274 is replicated to a second VTL, such as VTL 274a, at a second peer node, such as backup system 272a. The first container may be setup for replication to a second container of the same tape size and type in the second VTL. In some embodiments, replication occurs in all cartridges present in the first container. In other embodiments, replication occurs only on particular cartridges selected by a user.

In various embodiments, replication of data in the first container at the first peer node is initiated in the first node which requires knowledge particular configuration of the second node, including IP address, number of outstanding buffers, container identification, and various other parameters. In some embodiments, replication may be initiated by user input into a graphic user interface (GUI) at the first peer node and/or the second peer node. In some embodiments, replication may be initiated automatically at the first peer node and/or the second peer node by the VTL software programming of a VTL 274 and/or 274a, respectively. In other embodiments, replication may be similarly initiated at the DMA client 250 on a client device, such as 104, using Remote Data Access (RDA) protocol, OST protocol, etc. Once replication has been setup, the first container in the first peer node is synchronized with the second container in second peer node.

In some embodiments, the replicated data is then transmitted from the first peer node to the second peer node. In some embodiments, replicated backup data may be automatically transmitted by software on the NDMP tape server 270 and/or 270a, and/or by software on VTL 274 and/or 274a. In other embodiments, replication of the backup data may occur at the data server 260 and is transmitted from the data server 260. In other embodiments, the backup data may be transmitted from the first VTL 274. In some embodiments, the transmission of backup data to the second peer node is facilitated by DMA 250. The transmission of backup data to the second peer node may alternatively and/or additionally be facilitated by another DMA implemented on another NDMP client in the system.

At step 408, the replicated backup data is stored in a second container of the second VTL 274a. The backup data is stored on the OCAFS 276a of the second peer node. Because the backup data is being transmitted as a replica of the first OCAFS 276, the namespace of the container representing corresponding cartridges, are also replicated onto the second OCAFS 276a. Thus, the second container, and corresponding cartridges and devices, will include the base NDEIEX. As an example, a replicated cartridge in the second container may also be labeled NDEIEX_001.

At step 410, an activation code is assigned to the second container. In some embodiments, an activation code between 00-99 is chosen. In some embodiments, the activation code is assigned after synching of both peer nodes. In other embodiments, the activation code may be assigned upon accessing the replicated backup data at the second VTL 274a.

In some embodiments, the activation code may be assigned by a user at a GUI or command line interface at the second peer node and/or the first peer node. In other embodiments, an activation code may be automatically assigned by the VTL software of a VTL at the second peer node, such as VTL 274a. Such embodiments may require a distributed intelligence among all peer nodes within a system such that all assigned activation codes can be accounted for and not duplicated. In yet further embodiments, an activation code may be selected by the DMA 250 upon the accessing and activation of the second container by a client device 102 (further described below).

At step 412, the serial number of the second container, and its corresponding cartridges, are re-serialized based on the activation code. The serial number of the second container may be re-serialized by activation of the second VTL 274a. In some embodiments, the second VTL 274a is activated when the OCAFS 276a is IN_SYNC, which is a state where all files in both backup systems (such as 272 and 272a) are guaranteed to be in sync. In some embodiments, an activation process is implemented via the following management script:

/usr/loca/bin/vtl activate<your_replica>

Subsequently, the second VTL (274a) process may run but it now dynamically re-serializes the cartridge serial numbers using the activation code. The namespace of the data files in OCAFS 276a remains the same as in the originating peer node's OCAFS 276.

In some embodiments, a salt function is utilized to output a second base to label corresponding cartridges and devices at the second peer node. In some embodiments, the second VTL 274a implements the salt function to generate the re-serialized serial numbers for the cartridges of the second container. In other embodiments, the salt function may be implemented on the DMA client 250 on a client device, such as 102.

For example, an assigned activation code may be "16". The fifth letter "E" and sixth letter "X" of the first base prefix NDEIEX may be selected by the salt algorithm. Then the salt algorithm adds "E"+"1"/2 and "X"+"6"/2. Results that are lower case letters are then adjusted to capital letters in ASCII code. The resulting letters may then be inserted into their respective locations within the first base prefix. The resulting second base prefix may then be: NDEICG.

An example of a salt function, replsalt( ) with a given activation code of "16 " is provided below:

```
#include <syslog.h>
#include <stdio.h>
#include <stdlib.h>
#include <string.h>
#include <err.h>
#include <sys/types.h>
char g_repl_salt[3] = {"16"};
/* Add salt to a serial number base */
static char *replsalt(char *serial)
{
    static char ser[32];
    int i;
    if (!g_repl_salt[0]) return serial;
    memset(ser, 0, 32);
    memcpy(ser, serial, strlen(serial));
    if (g_repl_salt[0] == '0' && g_repl_salt[1] == '0') {
        return ser;
    }
    for (i = 4; i < 6; i++) {
        ser[i] = (serial[i] + g_repl_salt[i-4]) / 2;
        if (ser[i] > 57 && ser[i] < 65) {
            ser[i] = 'A' + (ser[i] - 57);
        }
    }
    return ser;
}
main( )
{
    printf("%s", replsalt("NDEIEX"));
}
```

The DMA 250 now inventories NDEICG_{001-999} cartridges in the second container of the second VTL 274a. The serial numbers of the tape drive and tape libraries are also changed to NDEICG_{01-09} and NDEICG_00. While the namespace of the data files on the second OCAFS 276a remain the same as the namespace of the data files stored on the first OCAFS 276, the second container, and corresponding cartridges and devices, are presented to the DMA 250 with unique serial numbers. In some embodiments, the activation code remains persistent in the node once the container is activated. In other embodiments, a new activation code may be generated and utilized in the salt function every time the DMA 250 attempts to access the replicated node.

The salt function may be variable in various embodiments. In other embodiments, the salt algorithm may select letters, numbers, or symbols at other places within the first base prefix on which to perform operations. In some embodiments, the salt algorithm may only select one letter, number, or symbol to alter. In other embodiments, any number of letters, numbers, or symbols may be selected by the salt algorithm. Other types of mathematical functions may be implemented onto the letters, numbers, or symbols by other implementations of the salt algorithm. In some embodiments, the first container at the first VTL 274 may be assigned an activation code and similarly re-serialized, as described in steps 410 and 412.

Once the second container of the second VTL 274a has been activated, the second container may expose the cartridges to DMA 250 in read-only mode, allowing DMA 250 to read the backup files and perform restore operations. If new cartridges of data and/or new backups are added to the first container of the first VTL 274, the second VTL 274a can perform a Rescan operation to re-synchronize in order to uniquely present the new cartridges and/or backups.

In a physical tape library, data stored on tape cartridges may be backed up or stored for archival purposes. A device, such as a robotic arm picks the tape cartridge to be archived and the tape cartridge is ejected from the tape library. The tape cartridge is then collected manually and sent to storage, such as at a data backup and records management organization (e.g., Iron Mountain, Inc.). As such, in a virtual tape library, current methods of archival may be emulated by exporting a container and/or cartridge via a SCSI command to the virtual tape library. Once the cartridge has been removed from the VTL, the DMA recognizes the absence of such cartridge and updates its catalogs to reflect the exported cartridge. Such exported virtual cartridge can be replicated and imported into another virtual library at the replicated end via an additional SCSI command. Once imported, the DMA can access the cartridge but recognizes the cartridge in a different virtual library.

This method of re-serializing replicated containers presents certain benefits. The disclosed methods and systems achieve archival of replicated data from a VTL without requiring import and export commands and/or operations. A data copy may be created that is compatible and accessible with existing tape library protocols. This allows the original cartridge to remain in the original VTL and be recognized as such by the DMA. This is more seamless than exporting, in which the original cartridge must be imported back into the original VTL. This may provide faster and simpler data identification for disaster recovery scenarios, as well as tape copy scenarios.

This method of re-serialization also allows for managed replication, in which only a subset of cartridges within a container are available to be replicated to a particular peer node at a particular site in a multi-domain data network. This may be an additional security measure for data. This may not occur in other current methods of data export and archival, in which an entire set of cartridges must be replicated and archived at a time.

FIGS. 5A-5D illustrate another example method 500 for dynamically re-serializing cartridges in a replicated virtual tape library, in accordance with one or more embodiments. At operation 501, a backup data file is stored in a first virtual tape library 513 residing on a first deduplication system at a first server node. The backup data file may be transmitted from a data server 260, such as in step 402. As described in step 404, the backup data file corresponds to a first cartridge stored in a first container 515 in the first virtual tape library 513. The first container 515 includes a first base prefix 517 such that the namespace of the first cartridge includes the first base prefix 517.

At operation 503, a replica of the backup data file corresponding to the first cartridge is stored in a second virtual tape library 519 residing on a second deduplication file system at a second server node. In some embodiments, the replica backup data file is replicated as described in step 406. The replica backup data file may be transmitted as described in steps 406 and 408. The replica backup data file corresponds to a second cartridge stored in a second container 521 in the second virtual tape library 519, such as in step 408. The first base prefix 517 is replicated to the second container 521 such that the namespace of the second cartridge is the same as the namespace of the first cartridge. In some embodiments, the replica backup data file corresponding to the second cartridge is the same as the backup data file corresponding to the first cartridge and is recognized as a replicated backup 523 in the second virtual tape library 519 by a data management application (DMA) 511.

At operation 505, an activation code is assigned to the second container 521, such as described in step 410. At operation 507 the first base prefix 517 is re-serialized using the activation code to form a second base prefix 525, such as in step 412. The presentation of the second cartridge includes the second base prefix 525. As further described in step 412, in some embodiments, re-serializing the first base prefix 517 includes using a salt algorithm 527 to output the second base prefix 525.

At operation 509, the replica backup data file in the second container is accessed via the data management application (DMA) 511, such as NDMP client 250. The data management application 511 may be implemented on a client device, such as client device 104 and/or 106.

Once replicated, a VTL may be presented read-only or read-write. This depends on single-domain or multi-domain configurations. In some embodiments, the first server node and the second server node comprise a multi-domain data network 529. The second container 521 may be activated in a first mode 531 such that the second container 521 is accessed in read-only mode while allowing replication to continue. In some embodiments, the first mode 531 is continuous replication. When a remote DMA wants to access backup sets that are backed up to the original container, the DMA is directed to the peer backup system. The VTL container in the peer backup system is activated causing the re-serialization of the peer VTL container and cartridges. The peer VTL container is activated in READ-ONLY mode while replication continues under the first mode 531.

The second container 521 may additionally, and/or alternatively, be activated in a second mode 533 such that the second container 521 is accessed in read-write mode while replication is discontinued. In some embodiments, the second mode 533 is replication disconnect. When a remote DMA wants to access backup sets that were backed up to the original container up to a point in time and it wants to use the other cartridges for newer backups of its own, the DMA is directed to the peer backup system, and replication is disjointed under the second mode 533. The peer backup system is activated causing the re-serialization of the peer VTL container and cartridges. The peer VTL container is activated in READ-WRITE mode while replication is disjointed under the second mode 533.

In some embodiments, the first server node and the second server node comprise a single-domain data network 535. In a single-domain network setup, a peer backup system, such as 272a, may be utilized for disaster recovery. In this case, activation of the second container 521 may cause the second container 521 to be presented in a read-write mode, and the second base prefix remains (537) the same as the first base prefix 517 after re-serializing. In some embodiments, disaster recovery may be implemented when the original container has failed and the DMA needs to use the replicated container 521. In some embodiments, the replicated container 521 in a backup system 272a in a single-domain data network 535 may be activated in READ-WRITE mode while replication is disjointed under the second mode 533.

However, in a disaster recovery, the presentation of the replicated container 521 to the DMA remains the same as the original container 515. In some embodiments, the activation code "00" may be used for disaster recovery. When input into the salt algorithm, no changes are made to the first base prefix 517 of the first container 515. Thus, the DMA recognizes the VTL tape devices, library and cartridges of replicated container 517 as if it were the original container 515.

In multi-domain configurations, the system may implement a cascaded replication to replicate the backup data to more than one target. In such cascaded replication, the different backup systems may select particular cartridges to replicate from a given first container. Cascading replication may be used where heavy traffic loads need to be balanced, allowing the first VTL to off-load replication traffic to a second and/or third VTL, in series, which can service replication updates to a large number of on-site and/or off-site DMAs. If two sites in a multi-domain DMA setup need to share a backup, data in a set of cartridges can be shared via presenting re-serialized serial numbers of the set.

On each target, the VTL can be re-serialized differently to present a unique view of the tape drive, medium changer and its accompanying cartridges. For example, method 500 may further comprise operation 539 in which a replica of the backup data file corresponding to the first cartridge are stored at a third server node in a third virtual tape library 541 residing on a third deduplication file system, similar to the processes of operation 503. As previously discussed, the replicated backup data may be transferred as described in steps 406 and/or 408. The replica backup data file corresponds to a third cartridge stored in a third container 543 in the third virtual tape library 541, similar to the data storage in the second container in step 408 and operation 503.

At operation 545, an activation code is assigned to the third container, such as in operation 505. In some embodiments, the activation code assigned to the third container may be different than the activation code assigned to the second container. As previously described, in some embodiments, a new activation code may be assigned to a container every time it is accessed by a DMA, such as NDMP client 250. In such embodiments, the activation code assigned to the third container may be the same as an activation code previously assigned to the second container.

At operation 547, the first base prefix is re-serialized using the activation code to form a third base prefix 549, such as in operation 507, such that the presentation of the third cartridge includes the third base prefix 549. Just as in step 412 and operation 507, re-serializing the first base prefix 517 includes using a salt algorithm 527 to output the second base prefix 549. The third container, and its corresponding cartridges and devices, can then be presented to the DMA 250 with serial numbers that are unique from the first and second containers.

While the present disclosure has been particularly shown and described with reference to specific embodiments thereof, it will be understood by those skilled in the art that changes in the form and details of the disclosed embodiments may be made without departing from the spirit or scope of the present disclosure. It is therefore intended that the present disclosure be interpreted to include all variations and equivalents that fall within the true spirit and scope of the present disclosure. Although many of the components and processes are described above in the singular for convenience, it will be appreciated by one of skill in the art that multiple components and repeated processes can also be used to practice the techniques of the present disclosure.

What is claimed is:

1. A system comprising:
    a first server node including a first virtual tape library of backup data files residing on a first deduplication file system,
        wherein a backup data file corresponding to a first cartridge is stored in a first container in the first virtual library;
        wherein the first container includes a first base prefix and the namespace of the first cartridge includes the first base prefix;
    a second server node including a second virtual tape library residing on second deduplication file system,
        wherein the second server node is configured to:
            receive a replica of the backup data file corresponding to the first cartridge via one or more data packets over a network,
            store the replica backup data file in a second container in the second virtual tape library such that the replica backup data file corresponds to a second cartridge,
            wherein the first base prefix is replicated to the second container such that the namespace of the second cartridge is the same as the namespace of the first cartridge;
        wherein the second virtual tape library is configured to:
            assign an activation code to the second container, and
            re-serialize the first base prefix using the activation code to form a second base prefix such that the presentation of the second cartridge includes a second base prefix.

2. The system of claim 1, further comprising a client device including data management application for accessing the replica backup data file in the second container.

3. The system of claim 2, wherein the replica backup data file corresponding to the second cartridge is the same as the backup data file corresponding to the first cartridge and is recognized as a replicated backup in the second virtual tape library by the data management application.

4. The system of claim 1, wherein re-serializing the first base prefix includes using a salt algorithm to output the second base prefix.

5. The system of claim 1, wherein the first server node and the second server node comprise a multi-domain data network.

6. The system of claim 5, wherein the second container is activated in a first mode such that the second container is accessed in read-only mode while allowing replication to continue.

7. The system of claim 5, wherein the second container is activated in a second mode such that the second container is accessed in read-write mode while replication is discontinued.

8. The system of claim 1, wherein the first server node and the second server node comprise a single-domain data network.

9. The system of claim 8, wherein activation of the second container causes the second container to he presented in read-write mode and the second base prefix remains the same as the first base prefix after re-serializing.

10. The system of claim 1, further comprising:
a third server node including a third virtual tape library residing on third deduplication file system;
wherein the third server node is configured to:
receive a replica of the backup data file corresponding to the first cartridge via one or more data packets over a network,
store the replica of the backup data file in a third container in the third virtual tape library such that the replica backup data file corresponds to a third cartridge,
wherein the first base prefix is replicated to the third container such that the namespace of the third cartridge is the same as the namespace of the first cartridge;
wherein the third virtual tape library is configured to:
assign an activation code to the third container; and
re-serialize the first base prefix using the activation code to form a third base prefix such that the presentation of the third cartridge includes the third base prefix.

11. A method for dynamically re-serializing cartridges in a virtual tape library, the method comprising:
storing, at a first server node, a backup data file in a first virtual tape library residing on a first deduplication file system,
wherein the backup data file corresponds to a first cartridge stored in a first container in the first virtual tape library, and
wherein the first container includes a first base prefix and the namespace of the first cartridge includes the first base prefix;
storing, at a second server node, a replica of the backup data file corresponding to the first cartridge in a second virtual tape library residing on a second deduplication file system,
wherein the replica backup data file corresponds to a second cartridge stored in a second container in the second virtual tape library, and
wherein the first base prefix is replicated to the second container such that the namespace of the second cartridge is the same as the namespace of the first cartridge;
assigning an activation code to the second container; and
re-serializing the first base prefix using the activation code to form a second base prefix such that the presentation of the second cartridge includes the second base prefix.

12. The method of claim 1 further comprising accessing the replica backup data file in the second container via a data management application implemented on a client device.

13. The method of claim 12, wherein the replica backup data file corresponding to the second cartridge is the same as the backup data file corresponding to the first cartridge and is recognized as a replicated backup in the second virtual tape library by the data management application.

14. The method of claim 1, wherein re-serializing the first base prefix includes using a salt algorithm to output the second base prefix.

15. The method of claim 1, wherein the first server node and the second server node comprise a multi-domain data network.

16. The method of claim 15, wherein the second container is activated in a first mode such that the second container is accessed in read-only mode while allowing replication to continue.

17. The method of claim 15, wherein the second container is activated in a second mode such that the second container is accessed in read-write mode while replication is discontinued.

18. The method of claim 1, wherein the first server node and the second server node comprise a single-domain data network.

19. The method of claim 18, wherein activation of the second container causes the second container to be presented in read-write mode and the second base prefix remains the same as the first base prefix after re-serializing.

20. The method of claim 1, further comprising:
storing, at a third server node, a replica of the backup data file corresponding to the first cartridge in a third virtual tape residing on a third deduplication file system,
wherein the replica backup data file corresponds to a third cartridge stored in a third container in the third virtual tape library, and
wherein the first base prefix is replicated to the third container such that the namespace of the third cartridge is the same as the namespace of the first cartridge;
assigning an activation code to the third container; and
re-serializing the first base prefix using the activation code to form a third base prefix such that the presentation of the third cartridge includes the third base prefix.

* * * * *